United States Patent
Drobitko et al.

(10) Patent No.: US 11,030,754 B2
(45) Date of Patent: *Jun. 8, 2021

(54) COMPUTER IMPLEMENTED PLATFORM, SOFTWARE, AND METHOD FOR DRAWING OR PREVIEW OF VIRTUAL IMAGES ON A REAL WORLD OBJECTS USING AUGMENTED REALITY

(71) Applicants: Andrey Drobitko, Kaliningrad (RU); Aleksandr Danilin, Penzenskaya oblast (RU); Mikhail Kopeliovich, Rostov (RU); Mikhail Petrushan, Rostov (RU)

(72) Inventors: Andrey Drobitko, Kaliningrad (RU); Aleksandr Danilin, Penzenskaya oblast (RU); Mikhail Kopeliovich, Rostov (RU); Mikhail Petrushan, Rostov (RU)

(73) Assignee: Sketchar, UAB, Vilnius (LT)

( * ) Notice: Subject to any disclaimer, the term of this patent is extended or adjusted under 35 U.S.C. 154(b) by 0 days.

This patent is subject to a terminal disclaimer.

(21) Appl. No.: 16/412,462

(22) Filed: May 15, 2019

(65) Prior Publication Data
US 2020/0364881 A1 Nov. 19, 2020

(51) Int. Cl.
*G06T 7/246* (2017.01)
*G06T 11/00* (2006.01)
*G06T 19/00* (2011.01)

(52) U.S. Cl.
CPC .............. *G06T 7/246* (2017.01); *G06T 11/00* (2013.01); *G06T 11/001* (2013.01);
(Continued)

(58) Field of Classification Search
CPC .......... G06F 3/011; G06F 3/017; G06F 3/013; G06F 3/04815; G06F 3/0346;
(Continued)

(56) References Cited

U.S. PATENT DOCUMENTS 9,965,895 B1 * 5/2018 Gray .................... G06T 19/006

OTHER PUBLICATIONS

Negara, Gede Putra Kusuma, Fong Wee Teck, and Li Yiqun. "Hybrid feature and template based tracking for augmented reality application." Asian Conference on Computer Vision. Springer, Cham, 2014. (Year: 2014).*

* cited by examiner

*Primary Examiner* — Xiao M Wu
*Assistant Examiner* — Scott E Sonners
(74) *Attorney, Agent, or Firm* — Inventa Capital PLC

(57) ABSTRACT

A computer-implemented method of the present invention allows the user to draw or preview images using augmented reality. The method is implemented by a processor executing a marker-less tracking algorithm stored in a memory of a mobile computing device. The method comprises detecting, by a page detector, an image of a drawing area; initializing a marker-less tracker, wherein said initializing comprises (a) capturing, via the page detector, a frame of the drawing area, (b) displaying, via a graphical user interface (GUI) of the mobile computing device, the frame of the drawing area, and (c) uniformly distributing template patches over the frame of the drawing area, and wherein the template patch is a fragment of texture of a template image used for surface tracking. The method further comprises executing a template patch tracking, wherein a perspective transformation of the template image to the frame as a current image is evaluated in video streaming on the GUI of the mobile computing device.

14 Claims, 5 Drawing Sheets

(52) U.S. Cl.
CPC ........ *G06T 19/006* (2013.01); *G06T 2200/24* (2013.01); *G06T 2207/10016* (2013.01)

(58) Field of Classification Search
CPC .... G06F 3/04883; G06F 1/163; G06F 3/0482; G06F 3/04842; G06F 16/7837; G06F 3/016; G06F 3/0481; G06F 3/0426; G06F 3/048; G06T 19/006; G06T 19/20; G06T 2200/24; G06T 11/60; G06T 7/60; G06T 7/70; G06T 2207/10024; G06T 2219/2016; G06T 11/203; G06T 19/003; G06T 2200/04; G06T 2207/10028; G06T 2207/30244; G06T 2219/024; G06T 3/40; G06T 19/00; G06T 2215/16; G02B 27/0172; G02B 27/017; G06K 9/00671; G06K 9/00664; G06K 9/00469; G06K 9/00604; A63F 13/23; G09G 2340/14; G09G 2354/00

See application file for complete search history.

| Patch state index | Patch state description |
|---|---|
| 0 | Initial patch |
| 1 | Patch candidate |
| 2 | Patch approved |
| 3 | Initial after approved |
| 4 | Candidate after initial |
| 5 | Approved after candidate |

FIG. 4

| Transition from state | Transition to state (if patch confidence is high during under-threshold number of frames) | Transition to state (if patch confidence is high during over-threshold number of frames) | Transition to state (if patch confidence is low) |
|---|---|---|---|
| 0 | 0 | 0 | 1 |
| 1 | 1 | 2 | 0 |
| 2 | 2 | 2 | 3 |
| 3 | 3 | 0 | 4 |
| 4 | 4 | 2 | 5 |
| 5 | 5 | 2 | 3 |

FIG. 5

COMPUTER IMPLEMENTED PLATFORM, SOFTWARE, AND METHOD FOR DRAWING OR PREVIEW OF VIRTUAL IMAGES ON A REAL WORLD OBJECTS USING AUGMENTED REALITY

FIELD OF THE INVENTION

The present invention relates to a computer implemented platform, a software, and a method using an augmented reality (AR) technology for placing of the augmented reality content over real world objects.

BACKGROUND OF THE INVENTION

Today, an augmented reality (AR) technology is used for displaying, through mixing, information about a virtual object created by computer technology and a real world, in the real world visible to a user. There are various fields where AR IS used. These fields include and are not limited to games, management of a manufacturing process, education, telemedicine, and the like. It is important to mention that interest in AR is growing due to more widespread distribution of mobile terminals to which AR technology may be applied, such as, a smart phone.

Various prior art systems and methods for displaying augmented reality (AR) content are known. Typical prior art AR device may include a display configured to display real-world content overlaid with AR content and at least one sensor configured to provide an output indicative of an orientation, location, or motion of the AR device. The system may also include a processor device configured to: cause the AR content to be shown on the display at an initial location on the display; determine a change in orientation of the AR device based on the output of the at least one sensor; and change a position of the AR content on the display to a second location on the display, wherein the change in position of the AR content from the initial location to the second location is related to the determined change in orientation of the AR device.

In some instances, displaying the AR content can interfere with the view of the real world. For example, displayed AR content may overlap with an object of interest in the real world and may obscure either partially or fully a user's view of the real-world object of interest. This can be inconvenient, distracting, or dangerous to the user.

In other instances, an amount of available AR content may exceed the display capabilities of the device or may require more space on the display than is available within a designated or predetermined virtual content display area on the display. Some disclosed embodiments may address these issues by enabling a user to reposition AR content on a display such that it does not interfere with (or at least interferes with less of) the user's view of real-world objects.

Placement of augmented reality content over real world objects requires precise tracking of such objects in consequent frames of video stream. Even small mislocation of surface's position in video frame may lead to visibly significant disturbances of augmented reality content. Thus, an algorithm is required capable to produce accurate tracking of observable surface in images. Furthermore, tracking algorithm should be robust under certain variations of observation point's position, illumination, shadows positions even in a case of "featureless" textures like such on white paper. Effective approach for tracking surfaces with low-intensive textures is to place hand drawn markers over texture. Such markers should be trackable and distinguishable from surrounding texture areas. For example, simple-form markers like circles, triangles, crosses, or complex-form markers like QR codes may be used on white paper surface for it's robust tracking. Obvious lack of this approach is the necessity to draw or print additional elements on observing object.

Moreover, if some hand-drawn markers are failed to detect, accuracy of tracking may suffer significantly. Therefore, an opportunity exists for improved system and method that will use algorithm of markerless tracking of plane surfaces in video images which will not require additional marks and be capable to deal with surfaces with low intensity textures.

Two known basic approaches for tracking are: static template approach and template update approach. Static template means that template patches descriptors are not updated during tracking. This method may fail to track patches in a case of strong transform (scaling, rotation, perspective) between template and current image especially if descriptors are low-invariant to such transform.

Template update approach involves step of patches descriptors update in each frame where patches were successfully tracked. Such update enables tracker to deal with even strong transforms since descriptors evolve together with transform evolution. Known lack of template update method is patches drift when forced update in each frame invokes slow change of descriptors even in motionless case.

SUMMARY OF THE INVENTION

A computer-implemented method of the present invention allows the user to draw images using augmented reality. The method is implemented by a processor executing a markerless tracking algorithm stored in a memory of a mobile computing device or in a cloud via LTE/5G or others. The method comprises detecting, by a page detector, an image of a drawing area; initializing a marker-less tracker, wherein said initializing comprises (a) capturing, via the page detector, a frame of the drawing area, (b) displaying, via a graphical user interface (GUI) of the mobile computing device, the frame of the drawing area, and (c) uniformly distributing template patches over the frame of the drawing area, and wherein the template patches is a fragment of texture of a template image used for surface tracking.

The method further comprises executing a template patches tracking, wherein a perspective transformation of the template image to the frame as a current image is evaluated in video streaming on the GUI of the mobile computing device. The method further includes a step of estimating a confidence level of the perspective transformation after the template patches tracking; and in response to the confidence level being low, switching from the template patches tracking to a re-initialization mode.

The method further allows computing an inverse matrix of the perspective transformation; and using the inverse matrix to transform, via a rough estimation, the current image of the perspective transformation to the template image. The method further includes enhancing a local texture contrast by performing image binarization with an adaptive local binarization threshold, wherein the local binarization threshold is calculated for each pixel as a function of intensities in a local surrounding region.

The method further includes detecting an out of the frame or an obscured template patch; filtering the out of the frame or the obscured template patch; and updating a contour of the out of the frame or the obscured template patch, wherein the template patch tracking is based on searching of one or more template patches as the current image is transformed by a roughly estimated perspective transformation.

The method further detects a correspondence between one or more coordinates of the template image and one or more coordinates of the current image; and evaluates the perspective transformation based on the correspondence by random sample consensus (RANSAC). The method further estimates a confidence level of the perspective transformation as a percentage based on the one or more coordinates of the current image having an under-threshold difference from one or more coordinates predicted by said evaluating the perspective transformation by RANSAC; and utilizes the confidence level as a criterion to switch to a re-initialization mode.

The method further allows updating an initial template patch with an initial descriptor to an updated template patch with a new descriptor; monitoring the updated template patch to validate it; responsive to a failure to validate the updated patch, switching back to the initial template patch with the initial descriptor. The method further provides enhancing the texture of the template image through template patches accumulation based on temporal averaging of binarized patches followed by preparing a rough estimation of the perspective transformation by computing, via an inverse matrix, the perspective transformation from the template image to the current image.

An advantage of the present invention is to provide the improved system and method that will use marker-less tracking algorithm (tracker) consisting of initialization, regular tracking, and reinitialization procedures.

Another advantage of the present invention is to provide the improved mobile application that is fully-fledged tool for teaching drawing using augmented reality, machine learning, and neural networks, wherein the mobile application is available on iOS, Android, MS HoloLens, Magic Leap, and other wearable AR(MR) glasses, whereby the mobile application puts virtual images on paper/canvas/wall to let the user trace drawings from the phone/glasses using the augmented reality.

Still another advantage of the present invention is to provide the improved mobile application that uses technology based on computer vision that allows the user to scan the environment and fix the virtual image over a real surface (outdoor or indoor).

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 illustrates a table of patches states; and

FIG. 5 illustrates a table of states transitions.

DESCRIPTION OF THE INVENTION

Figure 1:
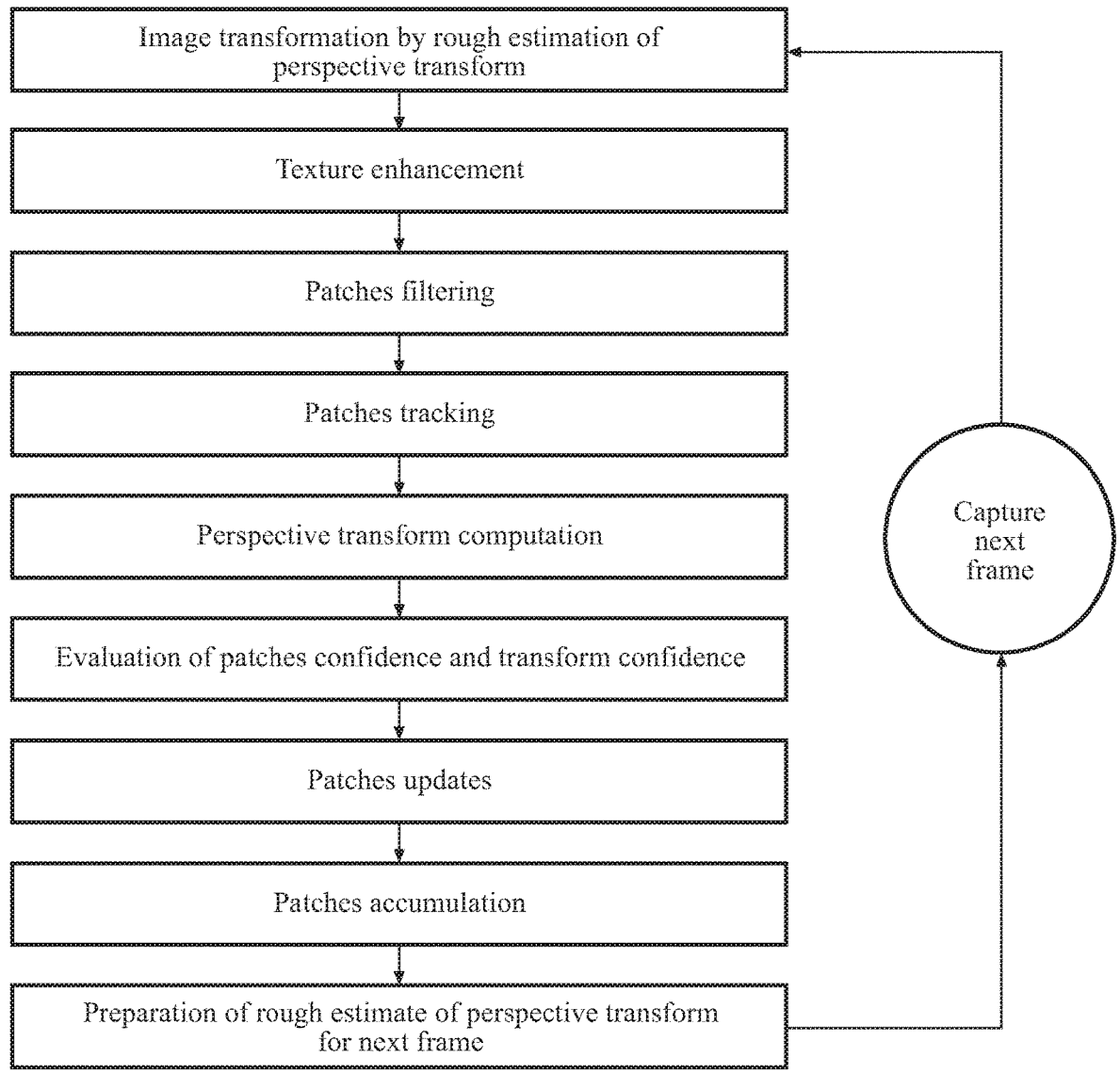
FIG. 1 illustrates a schematic view of the procedures of regular tracking cycle.
Figure 2A:
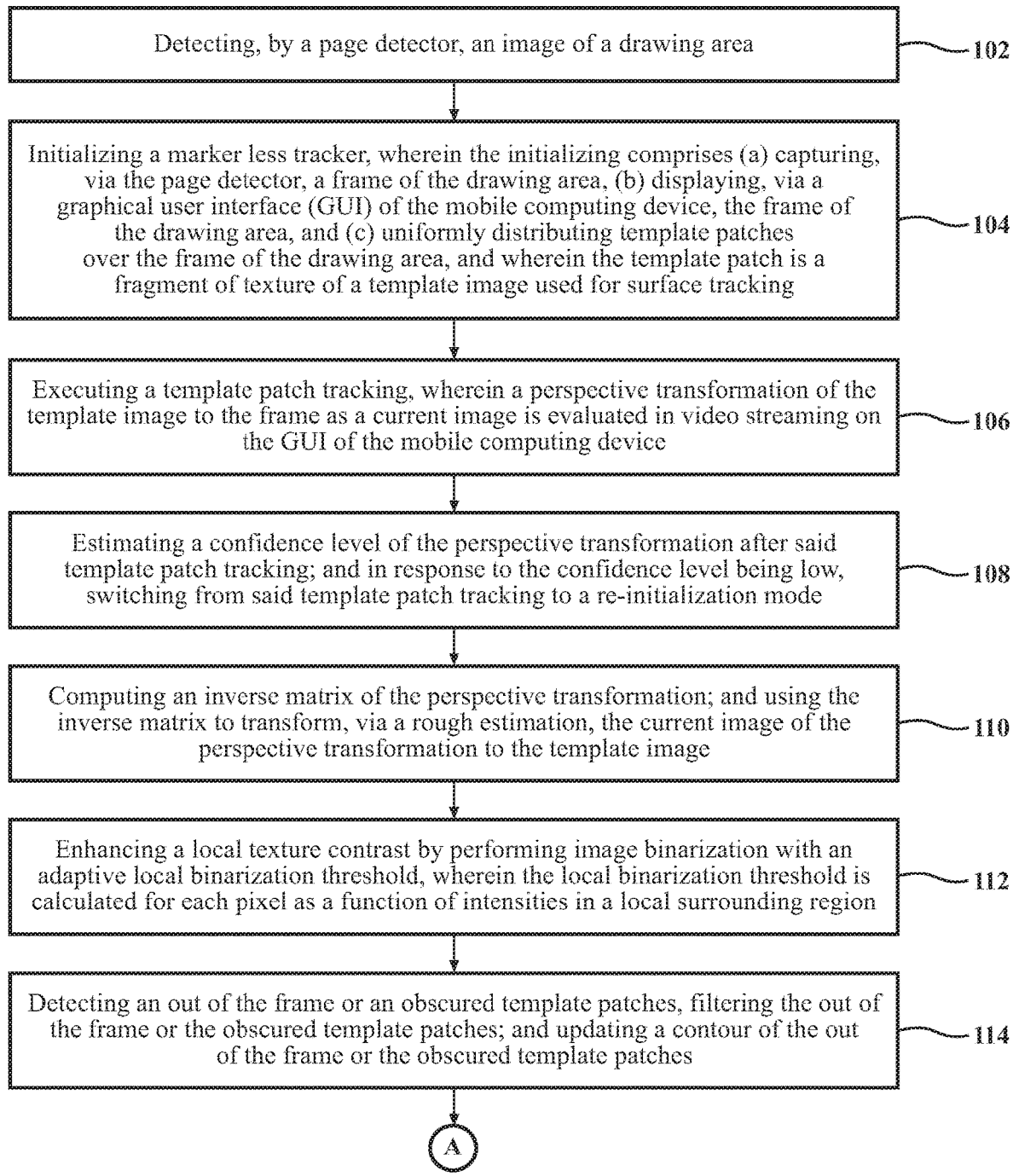
FIGS. 2A and 2B illustrate a diagram of a computer-implemented method of the present invention allows the user to draw images using augmented reality.
Figure 2B:
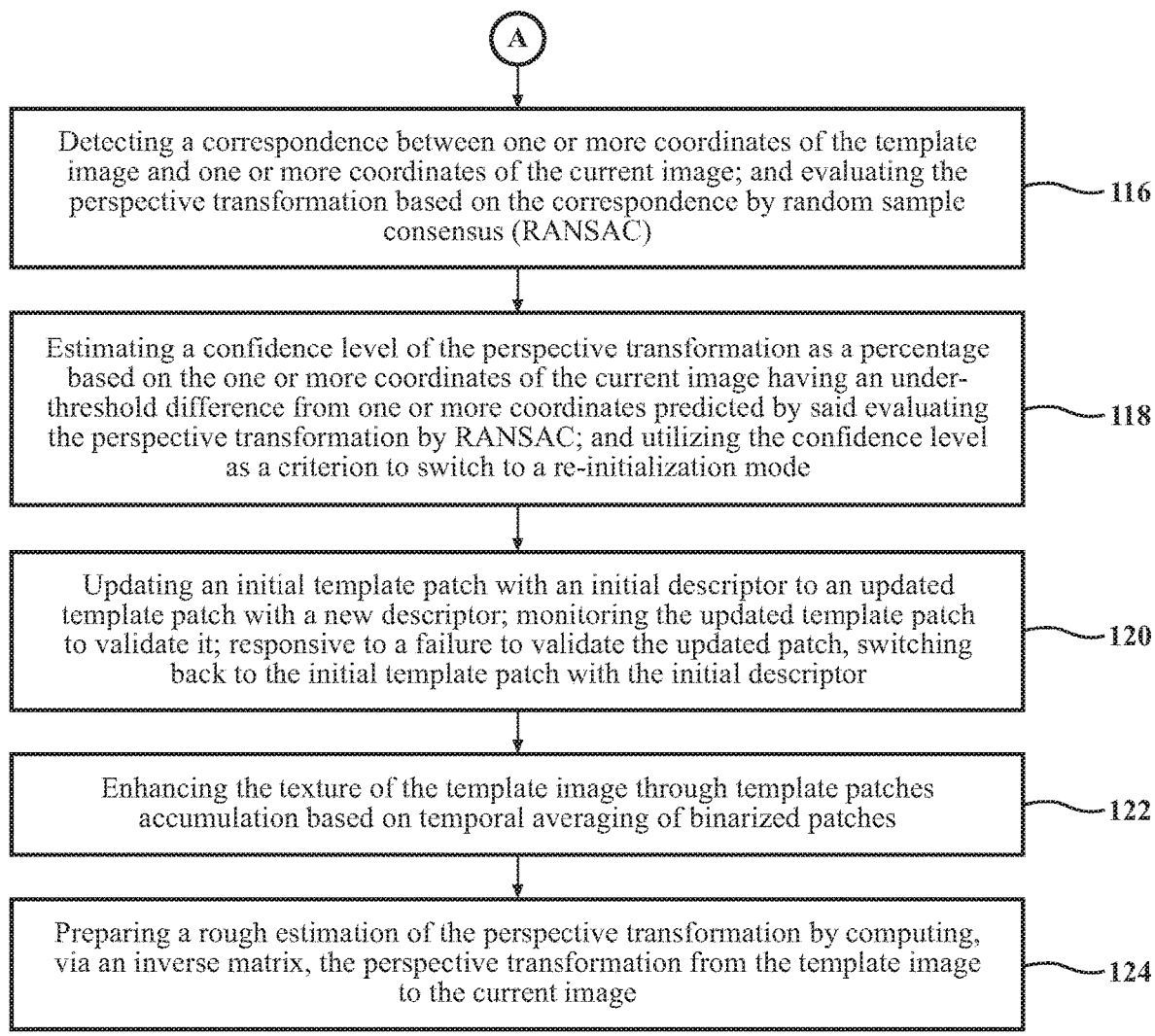
Figure 3:
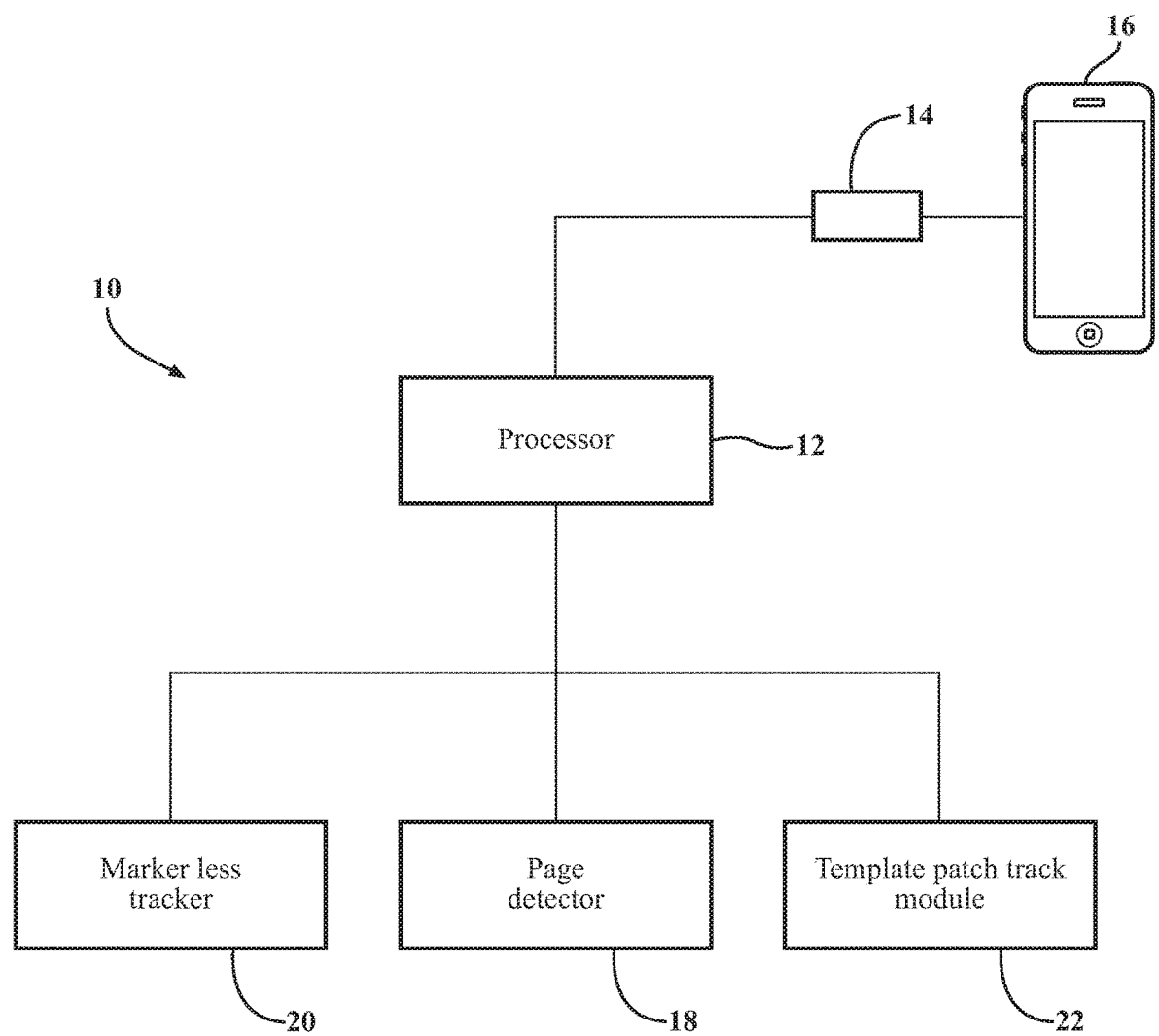
FIG. 3 illustrates a diagram of a computer-implemented platform of the present invention, which allows the user to draw images using augmented reality.

Referring to the FIGS. 1 through 3, a system, a method, and a non-transitory processor-readable medium, i.e. a computer readable medium, for allowing the user to draw images using augmented reality are shown. Because explicit identification of object-oriented constructs expressed through the syntax of high-level object-oriented programming languages is lost during compilation to binary code (e.g., translation of a source code definition or representation of an application to a binary code definition or representation of the application such as a machine code or byte-code definition), potential security vulnerabilities can be obscured during static analysis of the resulting binary code. For example, because information about an object (e.g., the class on which the object is based, the size of the object, the number and types or sizes of properties of the object, and the number of functionalities accessible to the object via a dispatch table) is typically not expressed in binary code, determining whether indirect operations relative to the object expose security vulnerabilities can be difficult without the source code from which the binary code was generated.

As a specific example, an indirect operation can result in arbitrary code execution security vulnerabilities if the binary code does not include run-time validation to ensure that the indirect operation does not operate outside or beyond the object (i.e., at memory addresses not allocated to or shared by the object). Some binary code representations of applications, however, do include information about objects. Such information can be included in binary code as run-time type information (RTTI) or debugging information that is compiled into the binary code. Nevertheless, because the binary code representations of many applications do not include such information (e.g., to discourage reverse engineering of these applications), robust methodologies and systems for analyzing binary code based on (or derived from) source code using object-oriented techniques should not assume availability of such information.

Implementations discussed herein analyze operations described in binary code to identify objects based on those operations. Said differently, implementations discussed herein reconstruct, at least partially, objects (or representations of objects) by inferring the structure of such objects based on operations described in binary code. Thus, implementations discussed herein can identify objects and attributes such as a size thereof without referring to (or independent of) source code or explicit information about such objects which may or may not be included in the binary code. Furthermore, implementations discussed herein perform security vulnerability analyses of binary code representations of applications using such objects. For example, implementations discussed herein can identify security vulnerabilities such as type confusion vulnerabilities that can result in arbitrary code execution, code injection, application failure, or other undesirable or unintended behavior of an application using information about objects identified by analysis of operations described in binary code.

As used herein, the term "software module" refers to a group of code representing instructions that can be executed at a computing system or processor to perform some functionality. Applications, software libraries (e.g., statically-linked libraries or dynamically-linked libraries), and application frameworks are examples of software modules. Additionally, as used herein, the terms "operations described in binary code" and "operations defined in binary code" and similar terms or phrases refer to operations described by code representing instructions that exist in a binary code representation (or binary representation) of a software module. In some implementations discussed herein, operations described in binary code are analyzed (e.g., parsed and interpreted) in a representation other than a binary code representation of a software module. For example, an object analysis system can analyze operations described in binary code using an intermediate representation of a software module derived from a binary code representation of that software module.

Accordingly, implementations discussed herein with reference to analysis of operations described in binary code should be understood to refer to analysis of those operations using a binary code representation of a software module or a representation of the software module derived from the binary code representation.

A variable within a memory is a memory location at which one or more values can be stored. Such a memory location can be at a processor memory (e.g., a register or cache), at a system memory (e.g., a Random Access Memory (RAM) of a computing system), or at some other memory. Operations within binary code that operate on such variables can refer to a memory address (either absolute or relative to another memory address such as an offset from a stack pointer) of that memory location. Thus, the identifier (e.g., memory address) of an object can be stored as a value at a memory location with a memory address that is used by operations within the binary code.

Accordingly, as used herein, terms such as "identifier of an object" and "memory address of an object" should be understood to refer to the identifier (e.g., memory address) itself or to a variable at which a value representing the identifier is stored. As used herein, the term "module" refers to a combination of hardware (e.g., a processor such as an integrated circuit or other circuitry) and software (e.g., machine- or processor-executable instructions, commands, or code such as firmware, programming, or object code).

A combination of hardware and software includes hardware only (i.e., a hardware element with no software elements), software hosted at hardware (e.g., software that is stored at a memory and executed or interpreted at a processor), or at hardware and software hosted at hardware.

Additionally, as used herein, the singular forms "a," "an," and "the" include plural referents unless the context clearly dictates otherwise. Thus, for example, the term "module" is intended to mean one or more modules or a combination of modules. Furthermore, as used herein, the term "based on" includes based at least in part on. Thus, a feature that is described as based on some cause, can be based only on that cause, or based on that cause and on one or more other causes.

It will be apparent that multiple embodiments of this disclosure may be practiced without some or all of these specific details. In other instances, well-known process operations have not been described in detail in order not to unnecessarily obscure the present embodiments. The following description of embodiments includes references to the accompanying drawing. The drawing shows illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

Alluding to the above, for purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

Referring to FIGS. 1 through 4, wherein like numerals indicate like or corresponding parts throughout the several views, a computer-implemented platform (the system) for drawing using augmented reality is generally shown at 10 in FIG. 3. The system 10 includes a processor 12 executing a marker-less tracking algorithm stored in a memory 14 of a mobile computing device 16. The system 10 includes a page detector 18 for detecting an image of a drawing area, a marker-less tracker 20 for initializing by capturing, via the page detector 18, a frame of the drawing area and displaying, via a graphical user interface (GUI) of the mobile computing device 16, the frame of the drawing area, and uniformly distributing template patches over the frame of the drawing area. The template patch is a fragment of texture of a template image used for surface tracking.

A template patch tracking module 22 of the system 10 is used for evaluating a perspective transformation of the template image to the frame as a current image is evaluated in video streaming on the GUI of the mobile computing device 16. The processor 12 is adaptable for estimating a confidence level of the perspective transformation after the template patch tracking, and in response to the confidence level being low, switching from the template patch tracking to a re-initialization mode. The processor 12 is adaptable for computing an inverse matrix of the perspective transformation, and using the inverse matrix to transform, via a rough estimation, the current image of the perspective transformation to the template image.

The processor 12 is adaptable for enhancing a local texture contrast by performing image binarization with an adaptive local binarization threshold, wherein the local binarization threshold is calculated for each pixel as a function of intensities in a local surrounding region. The processor 12 is adaptable for detecting an out of the frame or an obscured template patch and filtering the out of the frame or the obscured template patch; and updating a contour of the out of the frame or the obscured template patch.

The template patch tracking is based on searching of one or more template patches as the current image transformed by a roughly estimated perspective transformation. The processor 12 is adaptable for detecting a correspondence between one or more coordinates of the template image and one or more coordinates of the current image; and evaluating the perspective transformation based on the correspondence by random sample consensus (RANSAC). The processor 12 is adaptable for estimating a confidence level of the perspective transformation as a percentage based on the one or more coordinates of the current image having an under-threshold difference from one or more coordinates predicted by said evaluating the perspective transformation by RANSAC; and utilizing the confidence level as a criterion to switch to a re-initialization mode.

The processor 12 is adaptable for updating an initial template patch with an initial descriptor to an updated template patch with a new descriptor; monitoring the updated template patch to validate it; responsive to a failure to validate the updated patch, switching back to the initial template patch with the initial descriptor. The processor 12 is adaptable for enhancing the texture of the template image through template patches accumulation based on temporal averaging of binarized patches. The processor 12 is adaptable for preparing a rough estimation of the perspective transformation by computing, via an inverse matrix, the perspective transformation from the template image to the current image.

A computer readable medium storing code representing instructions that when executed at the processor 12 cause the processor 12 to store instructions to perform drawing using augmented reality and executing a marker-less tracking algorithm stored in a memory of the mobile computing device 16. comprising detecting, by a page detector 18, an image of a drawing area; initializing a marker-less tracker 20, wherein the initializing comprises (a) capturing, via the page detector, a frame of the drawing area, (b) displaying, via a graphical user interface (GUI) of the mobile computing device, the frame of the drawing area, and (c) uniformly distributing template patches over the frame of the drawing area, and wherein the template patch is a fragment of texture of a template image used for surface tracking; and executing template patches tracking, wherein a perspective transformation of the template image to the frame as a current image is evaluated in video streaming on the GUI of the mobile computing device.

Referring to FIGS. 1, 2A, and 2B, a computer-implemented method of the present invention, which allows the user to draw images using augmented reality, is generally shown at 100 in FIGS. 2A and 2B. The method is implemented by the processor 12 executing the marker-less tracking algorithm stored in the memory of the mobile computing device 16. The method comprises the step 102 of detecting, by the page detector 18, the image of the drawing area. The method 100 further include the step 104 of initializing the marker-less tracker 20, wherein said initializing comprises (a) capturing, via the page detector, a frame of the drawing area, (b) displaying, via a graphical user interface (GUI) of the mobile computing device, the frame of the drawing area, and (c) uniformly distributing template patches over the frame of the drawing area, and wherein the template patch is a fragment of texture of a template image used for surface tracking.

The method 100 further includes the step 106 of executing a template patch tracking, wherein a perspective transformation of the template image to the frame as a current image is evaluated in video streaming on the GUI of the mobile computing device. The method 100 further includes the step 108 of estimating a confidence level of the perspective transformation after the template patches tracking; and in response to the confidence level being low, switching from the template patches tracking to a re-initialization mode. The method 100 further includes the step 110 that allows computing an inverse matrix of the perspective transformation; and using the inverse matrix to transform, via a rough estimation, the current image of the perspective transformation to the template image. The method 100 further includes the step 112 of enhancing a local texture contrast by performing image binarization with an adaptive local binarization threshold, wherein the local binarization threshold is calculated for each pixel as a function of intensities in a local surrounding region.

The method 100 further includes the step 114 of detecting an out of the frame or an obscured template patch; filtering the out of the frame or the obscured template patch; and updating a contour of the out of the frame or the obscured template patch, wherein the template patch tracking is based on searching of one or more template patches as the current image transformed by a roughly estimated perspective transformation. The method 100 further includes the step 116 of detecting a correspondence between one or more coordinates of the template image and one or more coordinates of the current image; and evaluates the perspective transformation based on the correspondence by random sample consensus (RANSAC).

Alluding to the above, the method 100 further allows to estimate 118 a confidence level of the perspective transformation as a percentage based on the one or more coordinates of the current image having an under-threshold difference from one or more coordinates predicted by the evaluating the perspective transformation by RANSAC; and utilizes the confidence level as a criterion to switch to a re-initialization mode. The method 100 further allows updating 120 an initial template patch with an initial descriptor to an updated template patch with a new descriptor; monitoring the updated template patch to validate it; responsive to a failure to validate the updated patch, switching back to the initial template patch with the initial descriptor.

Alluding to the above, the method 100 further provides enhancing 122 the texture of the template image through template patches accumulation based on temporal averaging of binarized patches followed by preparing 124 a rough estimation of the perspective transformation by computing, via an inverse matrix, the perspective transformation from the template image to the current image.

Alluding to the above, the initialization procedure begins with the markerless tracker being initialized after detection of the paper area in image by page detector which returns paper area contour. Then, the template patches are distributed uniformly over this area. These template patches will be tracked further to estimate perspective transform between template and current image. Referring now to regular tracking, through regular tracking procedure, perspective transform is measured from template image to current image in video stream. To evaluate perspective transform, a number of template patches are tracked from template image to current frame in video stream.

Due to both classic static template and template update approaches are inapplicable for AR application by reasons mentioned above, the markerless tracker utilizes modified static template approach. Current image is transformed by rough estimation of perspective transform from current frame to template frame. Inverse matrix of perspective transform computed in previous frame is used as such rough estimation. Image, transformed in such way has relatively small displacement from template image, and, thus, patches can be tracked robustly within static template approach.

Procedures of regular tracking cycle are visualized in FIG. 1, presenting the regular tracking cycle. Image transformation by rough estimation of perspective texture enhancement is presented, wherein the texture enhancement procedure is required to increase tracker robustness to illumination changes. Taking into account that texture-related intensity variation in image of white paper may be significantly lower than variation caused by illumination and shadows, the procedure enhances local texture contrast by performing image binarization with adaptive local binarization threshold. This local threshold is calculated for each pixel as a function of intensities in local surrounding region. Such procedure preserves local texture-related patterns even under strong shadows and illumination gradients.

Patches filtering step excludes patches that are out of the paper area or overlapped by some object like hand or pen. Contours of such objects are updated in each frame by external procedures. This step improves tracker robustness. Patches tracking is based on searching of template patches in current image transformed by roughly estimated perspective transform. This search can be implemented in a form of similarity metric computation from template patch descriptor to current image patch descriptor in a sliding window. Similarity metric can be computed as correlation or mean square error between patches.

After finding coordinates correspondences between patches in template and current images in patches tracking step, perspective transform is evaluated by RANSAC method, which fits model of perspective transform to a set of coordinates correspondences. After perspective transform being computed, transform confidence is calculated as a percentage of patches which positions in current image have under-threshold difference from positions predicted by "best fit" perspective transform estimated at previous step by RANSAC method. Transform confidence is used as the criterion for switching to reinitialize mode—reinitialization occurs if confidence is low.

The patches confidences are calculated as a percentage of frames in sliding temporal window where trajectory of tracking of this patch corresponds to estimated perspective transform. The patches confidences are needed in patches updates step. The patches update plane surface appearance which may change during AR experience. For example, drawn content may appear on a white paper or hand may overlap it. In first case (drawn content) patches descriptors should be updated, in a second case (hand overlap) we should keep initial templates.

Due to confident distinguishing between these two cases sometimes is not possible, we constantly preserve initial templates even after switch to updated templates. It allows switching back to initial templates if we see that tracking of updated patches works worse. The patches states and transitions schema are presented in tables below.

FIG. 4 shows Table 1 listing Patch state index ranging from 0 to 5 and Patches states wherein Initial patch is a patch created in tracker's initialization procedure. As was mentioned above, initial patches are preserved constantly. Candidate state means that tracker creates new patches descriptor and monitors it during certain number of frames to treat it as approved (if new descriptor leads to confident tracking of this patch) or not. States 3,4,5 make possible switches to new descriptors (approved states), which are required if surface appearance changes permanently (for example, by drawing) and switches back to initial descriptors, which are required if surface changes temporarily (for example, by hand overlap). Each transition of patch state to "candidate" involves creation of new descriptor for tracking. Each transition to initial state involves descriptor switch to earlier preserved constant initial descriptor.

FIG. 5 shows Table 2 illustrating States transitions. Intensity variations on white paper are relatively low, so signal to noise ratio (SNR) on binarized image is low too. Effective texture enhancement method is temporal averaging of binarized patches. It suppresses noise, so SNR increases. After each transition of patch state such averaging starts and continues during constant number of frames. Rough estimate of perspective transform will follow. Next, rough estimation of perspective transform is prepared. It is computed as inverse matrix of perspective transform from template to current image. It will be used in next frame to perform image transformation to make it closer to template.

In a case if low transform confidence was obtained at certain frame, tracker switches to reinitialization (reinit) mode which involves soft reinit phase and hard reinit phase. Soft reinit is just enlargement of search areas in regular tracking. Tracker tries to perform soft reinit during certain number of frames, and, if failed, switches to hard reinit phase. Hard reinit is similar to initialization, it runs page detector until paper area is not found.

In markerless Multi template Tracker Idea of multi template tracking is as follows. If estimated transform between template and current image is strong but still confident then intermediary template is created and transition transform between initial template and intermediary template is saved.

Then, if we switch to intermediary template and compute local perspective transform between it and current image we can compute global transform from initial template to current image by multiplying transition transform matrix and local transform matrix. Thus, if a number of intermediary templates were created, then tracker switches to such intermediary template that is most close to current image.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. The invention could be used not only for education but in other spheres where we could use a virtual object in the real world objects—for instance, outdoor advertising using augmented reality. We can place a virtual image on any real surface as building.

The invention claimed is:

1. A computer-implemented method for drawing using augmented reality, wherein the method is implemented by a processor executing a marker-less tracking algorithm stored in a memory of a mobile computing device, the method comprising:
    detecting, by a page detector, an image of a drawing area;
    initializing a marker-less tracker, wherein said initializing comprises:
        (a) capturing, via the page detector, a frame of the drawing area, (b) displaying, via a graphical user interface (GUI) of the mobile computing device, the frame of the drawing area, and (c) uniformly distributing template patches over the frame of the drawing area, wherein the template patch is a fragment of texture of a template image used for surface tracking; and
    executing template patches tracking, wherein a perspective transformation of the template image to the frame as a current image is evaluated in video streaming on the GUI of the mobile computing device;
    updating an initial template patch with an initial descriptor to an updated template patch with a new descriptor;
    monitoring the updated template patch to validate it; and
    responsive to a failure to validate the updated patch, switching back to the initial template patch with the initial descriptor.

2. The method of claim 1, further comprising:
    estimating a confidence level of the perspective transformation after said template patch tracking; and
    in response to the confidence level being low, switching from said template patch tracking to a re-initialization mode.

3. The method of claim 1, further comprising:
    computing an inverse matrix of the perspective transformation; and using the inverse matrix to transform, via a rough estimation, the current image of the perspective transformation to the template image.

4. The method of claim 1, further comprising:
enhancing a local texture contrast by performing image binarization with an adaptive local binarization threshold, wherein the local binarization threshold is calculated for each pixel as a function of intensities in a local surrounding region.

5. The method of claim 1, further comprising:
detecting an out of the frame or an obscured template patch;
filtering the out of the frame or the obscured template patch; and
updating a contour of the out of the frame or the obscured template patch.

6. The method of claim 1, wherein the template patch tracking is based on searching of one or more template patches as the current image transformed by a roughly estimated perspective transformation.

7. The method of claim 1, further comprising:
detecting a correspondence between one or more coordinates of the template image and one or more coordinates of the current image; and
evaluating the perspective transformation based on the correspondence by random sample consensus (RANSAC).

8. The method of claim 7, further comprising:
estimating a confidence level of the perspective transformation as a percentage based on the one or more coordinates of the current image having an under-threshold difference from one or more coordinates predicted by said evaluating the perspective transformation by RANSAC; and
utilizing the confidence level as a criterion to switch to a reinitialization mode.

9. The method of claim 1, further comprising enhancing the texture of the template image through template patches accumulation based on temporal averaging of binarized patches.

10. The method of claim 9, further comprising preparing a rough estimation of the perspective transformation by computing, via an inverse matrix, the perspective transformation from the template image to the current image.

11. A computer-implemented method for drawing using augmented reality, wherein the method is implemented by a processor executing a marker-less tracking algorithm stored in a memory of a mobile computing device, the method comprising:
detecting, by a page detector, an image of a drawing area;
initializing a marker-less tracker, wherein said initializing comprises:
(a) capturing, via the page detector, a frame of the drawing area, (b) displaying, via a graphical user interface (GUI) of the mobile computing device, the frame of the drawing area, and (c) uniformly distributing template patches over the frame of the drawing area, wherein the template patch is a fragment of texture of a template image used for surface tracking;
executing template patches tracking, wherein a perspective transformation of the template image to the frame as a current image is evaluated in video streaming on the GUI of the mobile computing device;
detecting a correspondence between one or more coordinates of the template image and one or more coordinates of the current image;
evaluating the perspective transformation based on the correspondence by random sample consensus (RANSAC);
estimating a confidence level of the perspective transformation as a percentage based on the one or more coordinates of the current image having an under-threshold difference from one or more coordinates predicted by said evaluating the perspective transformation by RANSAC; and
utilizing the confidence level as a criterion to switch to a reinitialization mode.

12. A non-transitory computer readable medium storing code representing instructions that when executed by a processor, cause the processor to perform drawing using augmented reality and to execute a marker-less tracking algorithm stored in a memory of a mobile computing device, the instructions to perform a method, the method comprising:
detecting, by a page detector, an image of a drawing a rea;
initializing a marker-less tracker, wherein said initializing comprises:
(a) capturing, via the page detector, a frame of the drawing area, (b) displaying, via a graphical user interface (GUI) of the mobile computing device, the frame of the drawing a rea, and (c) uniformly distributing template patches over the frame of the drawing area, wherein the template patch is a fragment of texture of a template image used for surface tracking;
executing template patches tracking, wherein a perspective transformation of the template image to the frame as a current image is evaluated in video streaming on the GUI of the mobile computing device;
updating an initial template patch with an initial descriptor to an updated template patch with a new descriptor;
monitoring the updated template patch to validate it; and
responsive to a failure to validate the updated patch, switching back to the initial template patch with the initial descriptor.

13. The method of claim 12, further comprising enhancing the texture of the template image through template patches accumulation based on temporal averaging of binarized patches.

14. The method of claim 13, further comprising preparing a rough estimation of the perspective transformation by computing, via an inverse matrix, the perspective transformation from the template image to the current image.

* * * * *